VIDEO GATING CIRCUIT
Filed Aug. 9, 1965
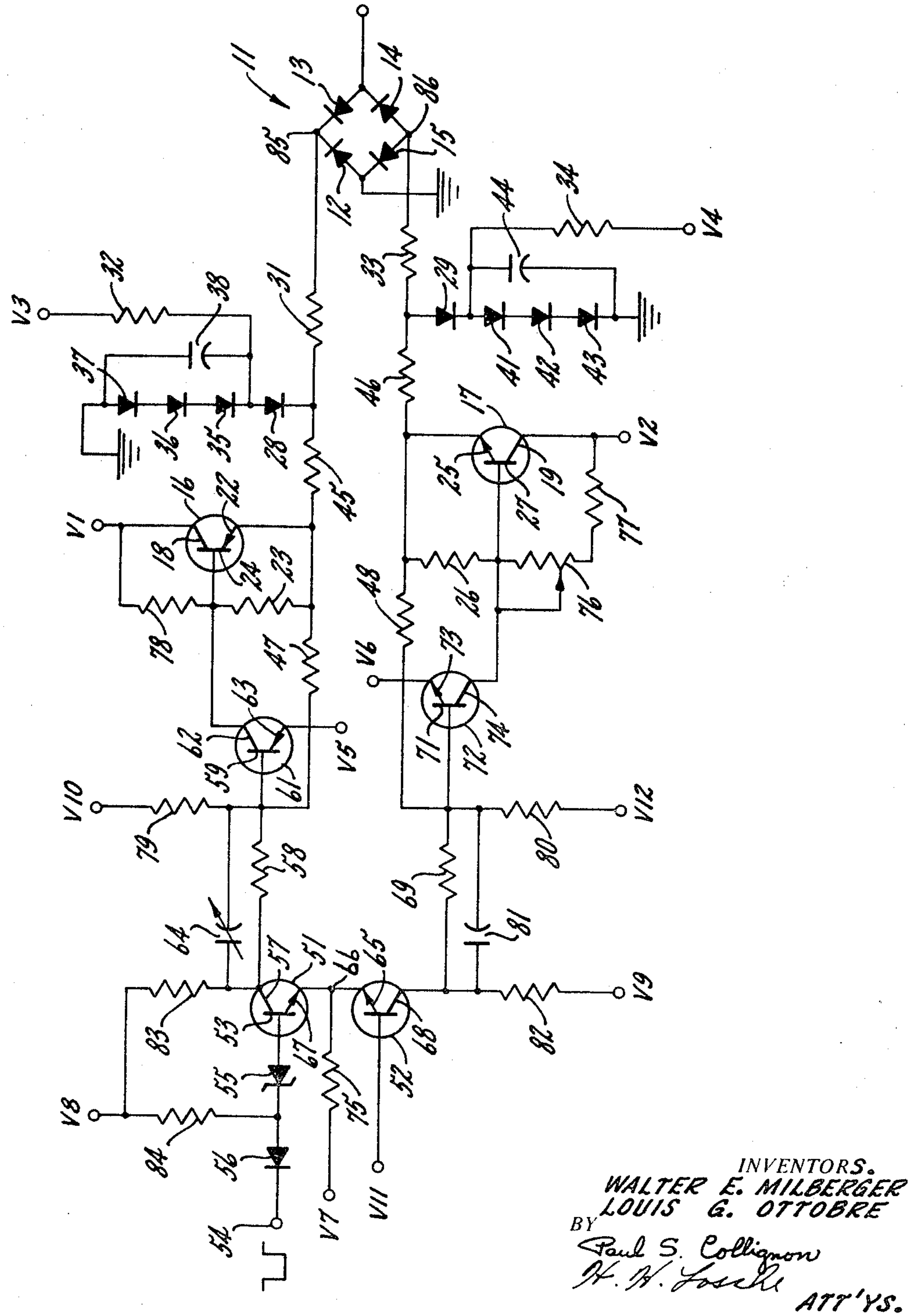
INVENTORS.
WALTER E. MILBERGER
LOUIS G. OTTOBRE
BY
Paul S. Collignon
H. H. Losche
ATT'YS.

United States Patent Office 3,449,596
Patented June 10, 1969

3,449,596

VIDEO GATING CIRCUIT

Walter E. Milberger, West Severna Park, Md., and Louis G. Ottobre, Corona, N.Y., assignors, by mesne assignments, to the United States of America as represented by the Secretary of the Navy

Filed Aug. 9, 1965, Ser. No. 478,493
**Int. Cl. H03k *17/16***
U.S. Cl. 307—257 2 Claims

ABSTRACT OF THE DISCLOSURE

An improved video gating circuit for eliminating or controlling undesirable residue or pedestal voltage gating transients having a diode bridge network driven by a pair of complementary operational amplifiers utilizing positive feedback, for overcoming storage and delay variations associated with saturated switching while providing a relatively high voltage gain and properly biasing the diode bridge. A pair of diode clamps serve to minimize pedestal modulation.

The present invention relates to an improved circuit for controlling and eliminating gating transients. The invention is particularly useful in the receiver of a tracking radar system.

BACKGROUND OF THE INVENTION

One main problem which is common to gating circuits in which gating techniques are employed to provide sensing information is that the gate pulses themselves introduce errors. This is due to the imperfections in the switches. The gate pulses create transients which pass through the switches along with the video pulses and which appear in attenuated form at the output circuit of the switches. These transients are commonly known as "residue" or "pedestal" voltages and are highly undesirable.

SUMMARY OF THE INVENTION

The present invention provides a precision video gating circuit for eliminating or controlling gating transients. The gate utilizes a diode bridge network arrangement driven by a pair of complementary operational amplifiers to overcome the storage and delay variations associated with saturated switching. A positive feedback loop is provided for each operational amplifier in order to take some of the load off the drive stages, thus providing a higher voltage gain, and also to back bias the diode bridge. Two diode clamps are utilized to minimize pedestal modulation and to act as low impedance decoupling points. The bridge offset voltage is adjustable by means of a potentiometer, and pulse time coincidence is achieved by an adjustable capacitor.

It is therefore a general object of the present invention to provide an improved circuit for controlling gating transients.

Another object of the present invention is to provide a precision video gate for a tracking receiver in a radar system.

BRIEF DESCRIPTION OF THE DRAWING

Other objects and advantages of the present invention will be readily appreciated as the same becomes better understood by reference to the following detailed description when considered in connection with the accompanying drawing which is a schematic diagram of an illustrative embodiment of the present invention.

DESCRIPTION OF THE PREFERRED EMBODIMENT

Referring to the drawing, there is illustrated a general purpose gate wherein a drive circuit is used to drive a diode bridge network 11 consisting of diodes 12, 13, 14, and 15. First and second drive paths are provided, one drive path being connected to the common point of diodes 12 and 13, and the other drive path being connected to the common point of diodes 14 and 15. Operational amplifiers 16 and 17 are provided, one each in each drive path.

The collector 18 of transistor 16 is connected to a negative voltage source V1 and the collector 19 of transistor 17 is connected to a positive voltage source V2. Minor loop positive feedbacks are provided for operational amplifiers 16 and 17. For amplifier 16, the feedback loop is from emitter 22 through resistor 23 and to base 24, and likewise, for amplifier 17, the feedback loop is from emitter 25 through resistor 26 and to base 27.

A pair of diode clamps are provided, one each for each drive path, and consist of diodes 28 and 29 that establish a flat top drive. Diode 28 has one terminal connected through resistor 31 to the common point of diodes 12 and 13, and the other end of diode 28 is connected through resistor 32 to voltage source V3. Likewise, diode 29 has one terminal connected through resistor 33 to the common point of diodes 14 and 15, and the other end of diode 29 is connected through resistor 34 to voltage source V4.

A pair of transistors 51 and 52 are provided one each in each drive path. Transistor 51 has its base 53 connected through diodes 55 and 56 to input terminal 54, and the collector 57 of transistor 51 is connected through a resistor 58 to the base 59 of transistor 61. The collector 62 of transistor 61 is connected to the base 24 of amplifier 16 and the emitter 63 of transistor 61 is connected to voltage source V5. A variable capacitor 64 is connected between collector 57 of transistor 51 and base 59 of transistor 61, in parallel with resistor 58, and pulse time coincidence is achieved by adjusting capacitor 64.

Transistor 52 has its emitter 65 connected through junction point 66 to the emitter 67 of transistor 51, and the collector 68 of transistor 52 is connected through resistor 69 to base 71 of transistor 72. The emitter 73 of transistor 72 is connected to voltage source V6, and the collector 74 of transistor 72 is connected to base 27 of amplifier 17. Junction point 66 which is common to the emitters of transistors 51 and 52 is connected through resistor 75 to voltage source V7.

The circuit shown in the drawing was constructed and tested with the following components and values:

*Voltages*

| | Volts |
|---|---|
| V1 | −8 |
| V2 | +8 |
| V3 | −8 |
| V4 | +8 |
| V5 | +8 |
| V6 | −8 |
| V7 | −28 |
| V8 | +8 |
| V9 | +8 |
| V10 | +28 |
| V11 | −8 |
| V12 | −28 |

*Transistors*

| | |
|---|---|
| 16 | 2N–1135 |
| 17 | 2N–697 |
| 51 | 2N–753 |
| 52 | 2N–753 |
| 61 | 2N–996 |
| 72 | 2N–753 |

*Diodes*

| | |
|---|---|
| 12 | FD600 |
| 13 | FD600 |
| 14 | FD600 |
| 15 | FD600 |
| 28 | FD600 |
| 29 | FD600 |
| 35 | FD600 |
| 36 | FD600 |
| 37 | FD600 |
| 41 | FD600 |
| 42 | FD600 |
| 43 | FD600 |
| 55 | IN–752 |
| 56 | FD600 |

*Resistors*

| | Ohms |
|---|---|
| 23 | 1K |
| 26 | 1K |
| 31 | 15 |
| 32 | 1.5K |
| 33 | 15 |
| 34 | 1.5K |
| 45 | 30 |
| 46 | 30 |
| 47 | 6.8K |
| 48 | 6.8K |
| 58 | 4.7K |
| 69 | 4.7K |
| 75 | 1.6K |
| 76 (potentiometer) | 1K |
| 77 | 750 |
| 78 | 750 |
| 79 | 7.5K |
| 80 | 7.5K |
| 82 | 1.6K |
| 83 | 1.3K |
| 84 | 5.1K |

*Capacitors*

| | | |
|---|---|---|
| 38 | mf | 56 |
| 44 | mf | 56 |
| 64 | mmf | 9–35 |
| 81 | mmf | 2.2 |

In operation, under steady state conditions, the input 54 to diode 56 rests at ground potential. This permits transistor 51 to be biased on, thus holding transistor 52 off as a result of current flowing through resistor 75. Assuming that the circuit shown in the drawing has the components and values listed in the tables above, the collector 57 of transistor 51 rests at −8 volts and the collector 68 of transistor 52 rests at +8 volts. This condition places approximately +5.5 volts back-bias on diode bridge 11 at the junction 85, which is common to diodes 12 and 13, and approximately −5.5 volts back-bias at junction point 86, which is common to diodes 14 and 15.

Gate turn-on is effected when the input signal at terminal 54 is driven to −8 volts. The application of −8 volts at terminal 54 causes transistor 51 to decrease conduction thereby permitting the emitter 65 of transistor 52 to become negative with respect to its base. This action causes collector 57 of transistor 51 to seek +8 volts and collector 68 of transistor 52 to establish −8 volts. Following this action, the emitter 22 of transistor 16 switches from +5.5 volts to −5.5 volts and the emitter 25 of transistor 17 switches from −5.5 volts to +5.5, consequently, diode bridge 11 conducts to provide an output at terminal 87.

The minor loop feedback of amplifier 16 from emitter 22 through resistor 23 to base 24, and the minor loop feedback of amplifier 17 from emitter 25 through 26 to base 27, takes some of the load off of the drive stages thus affording a higher voltage gain, and also the feedbacks bias diode bridge 11 so that when the bias is switched on via transistors 61 and 72, the voltages on the emitters of amplifiers 16 and 17 are immediately pulled down, thus decreasing the discharge delay time.

The diode clamps 28 and 29 establish a flat top drive at about ±3 volts and, accounting for the forward voltage drop across diode bridge 11, this permits approximately a 150 ma. quad current to flow. The bridge offset voltage is made adjustable by potentiometer 76 which causes the drop across diode 29 to be variable thereby balancing that level to its complement side, which is diode 28.

It can thus be seen that the present invention provides an improved circuit for reducing gating transients. Obviously many modifications and variations of the present invention are possible in the light of the above teachings. It is therefore to be understood, that within the scope of the appended claims, the invention may be practiced otherwise than as specifically described.

What is claimed is:

1. A video gating circuit for reducing gating transients comprising:

input terminal means for receiving an input gating signal to cause said video gating circuit to switch from a first condition to a second condition;

a first transistor having emitter, base, and collector electrodes, said emitter electrode being coupled to a first source of direct current potential, said base electrode being coupled to said input terminal means for receiving said input gating signal and to a second source of direct current potential for receiving a bias potential, and said collector electrode being coupled to said second source of direct current potential for receiving a bias potential;

a second transistor having emitter, base, and collector electrodes, said emitter electrode thereof being coupled in common with said emitter electrode of said first transistor to said first source of direct current potential to cause said second transistor to conduct alternately with respect to said first transistor, said base electrode thereof being coupled to a third source of direct current potential for receiving a bias potential, and said collector electrode thereof being coupled to said second source of direct current potential for receiving a bias potential;

solid state gating means having first and second gating terminals, an input terminal, and an output terminal;

a first solid state, driving operational amplifier having input means coupled to said collector electrode of said first transistor and having output means coupled to said first gating terminal of said solid state gating means;

a second solid state, driving operational amplifier for providing a driving potential complementary to that provided by said first operational amplifier, said second operational amplifier having input means coupled to said collector electrode of said second transistor and having output means coupled to said second gating terminal of said solid state gating means whereby said input terminal and said output terminal of said solid state gating means are electrically coupled to one another upon application of an input gating signal to said input terminal means, and remain electrically coupled for the duration of each said input gating signal;

a fixed capacitance coupled between said collector electrode of said second transistor and said input means of said second operational amplifier; and a variable capacitance coupled between said collector electrode of said first transistor and said input means of said first operational amplifier for providing adjustment of gating pulse time coincidence between the respective gating pulses applied to said first and second driving operational amplifiers by said first and second transistors in response to said input gating signal applied to said input terminal means.

2. A video gating circuit for reducing gating transients as set forth in claim 1 wherein:

said solid state gating means comprise diode bridge means; and said first and second complementary operational amplifiers each include feedback means for reverse biasing said diode bridge network during the absence of an input gating pulse at said input terminal means, and diode clamping means for improving the shape of the driving pulses therefrom.

References Cited

UNITED STATES PATENTS

| | | | |
|---|---|---|---|
| 2,983,873 | 5/1961 | Mintzer. | |
| 3,027,508 | 3/1962 | Johnson. | |
| 3,041,475 | 6/1962 | Fisher | 307—257 X |
| 3,064,250 | 11/1962 | Close. | |
| 3,079,599 | 2/1963 | Caspers. | |
| 3,163,776 | 12/1964 | Teetor | 307—257 |
| 3,179,817 | 4/1965 | Bounsall | 307—257 X |
| 3,222,547 | 12/1965 | Boan et al. | 307—257 X |
| 3,292,010 | 12/1966 | Brown et al. | 307—257 X |

DONALD D. FORRER, *Primary Examiner.*

U.S. Cl. X.R.

307—237, 239, 313